Dec. 2, 1958    R. P. TRAINER    2,862,786
FLUID CATALYST PROCESS AND APPARATUS
Filed June 28, 1955
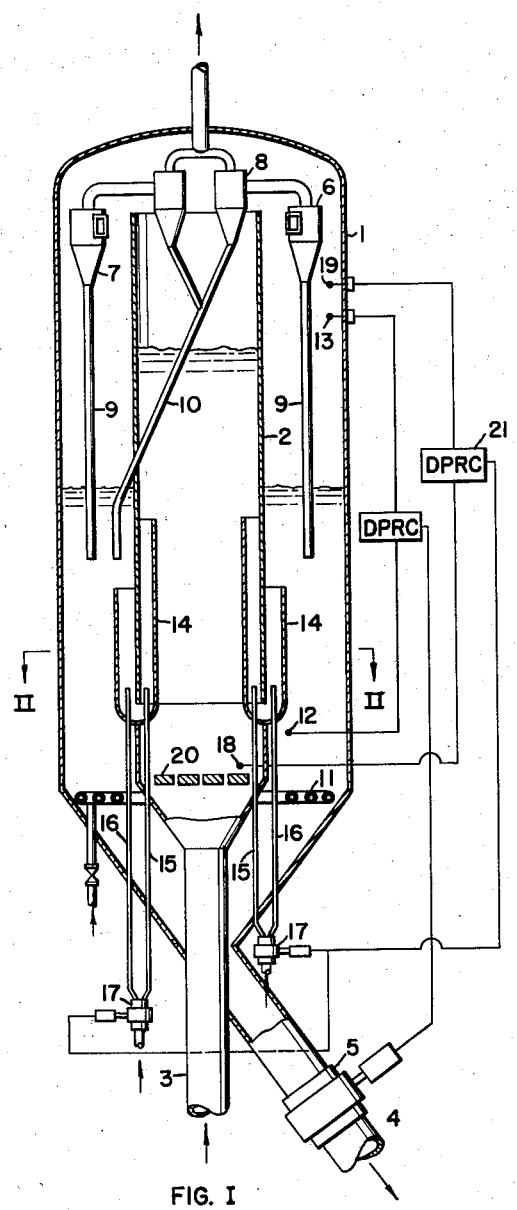
FIG. I
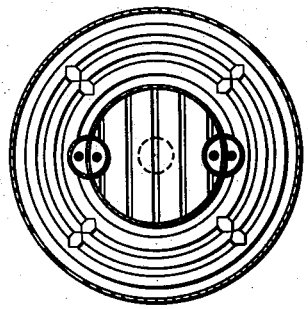
FIG. II
INVENTOR
RICHARD P. TRAINER
BY
HIS ATTORNEY United States Patent Office 2,862,786
Patented Dec. 2, 1958

2,862,786

FLUID CATALYST PROCESS AND APPARATUS

Richard P. Trainer, Babylon, N. Y., assignor to Shell Development Company, New York, N. Y., a corporation of Delaware Application June 28, 1955, Serial No. 518,465

2 Claims. (Cl. 23—1)

This invention relates to an improvement in apparatus and operation of upflow fluidized catalyst reactors. The invention relates in particular to the application of upflow reactors in the catalytic cracking of hydrocarbons using the fluidized catalyst technique.

In the catalytic cracking of hydrocarbons using the fluidized catalyst technique, the finely divided cracking catalyst is continuously cycled through a cracking zone, a stripping zone, and a separate regeneration zone. The catalyst in the respective zones is maintained in the fluidized or so-called pseudo liquid state.

The reaction vessel, which may be either the cracking reactor, or the regenerator, or both, may be either of the upflow or downflow type. During operation with either type the rate of withdrawal of catalyst from the vessel during the circulation must equal the rate of introduction of catalyst. The fundamental distinction between the two types is that in the upflow type the catalyst is withdrawn as a suspension in the vapors, whereas in the downflow type the catalyst is separately withdrawn in the pseudo liquid state by gravity flow directly from the fluidized bed.

The downflow type reaction vessel has generally been preferred since it allows flexibility in the operation. Thus, the bed level, which determines the quantity of catalyst in the vessel and hence the space velocity at any given vapor rate, may be adjusted as desired irrespective of the amounts of catalyst and reactant vapor introduced.

The upflow type affords a more efficient contact than the downflow type but suffers the disadvantage that it is inflexible. Thus, the bed level is dependent only upon the amounts of reactant feed and catalyst introduced. If the rate of vapor feed is increased, the bed level falls, and vice versa; if the catalyst circulation rate is increased, the bed level rises, and vice versa. At any given rate of introduction of reactant feed and catalyst the bed level assumes an equilibrium position at which it remains fixed. Attempts have been made to overcome this serious shortcoming of upflow type reaction vessels by providing them with mechanical arrangements by which the effective diameter of the vessel may be adjusted. Such arrangements, while mechanically possible, are impractical.

The present invention provides a modification of upflow reactor and mode of operation whereby the quantity of fluidized catalyst in the reaction zone, i. e. the level of the fluidized catalyst bed, may be altered and controlled at will irrespective of the rates of flow of the vapor and catalyst to the reactor. Thus, a low bed level affording a high space velocity may be maintained at a low vapor rate and/or high catalyst circulation rate (high catalyst-to-vapor ratio), or a high level affording a low space velocity may be maintained at a high vapor rate and/or low catalyst rate (low catalyst-to-vapor ratio), either of which is impossible in upflow reactors hitherto used.

The process and apparatus of the invention will be described in more detail in connection with the accompanying drawing.

Figure I of the drawing is a vertical view in section of one suitable apparatus. Figure II is a plan view in section of the same apparatus.

Referring to the drawing, the apparatus comprises a vertically disposed cylindrical vessel 1 having suitable top and bottom closures. The interior of the vessel is divided in horizontal cross-section into two zones by a partition which is sealed at the bottom and extends to a high point in the vessel short of the top thereof. For convenience these zones will be called the reaction zone and the hopper zone. In the case of the catalytic cracking of hydrocarbon oils, the reaction zone may be the zone in which the cracking takes place or it may be the zone in which the carbonaceous deposits on the catalyst are reacted with oxygen. The hopper zone may function solely as a hopper or collection zone or it may also function in addition as a stripping zone. In the apparatus illustrated the partition takes the form of an inner cylinder 2 open at the top and sealed to inlet line 3 which passes through the bottom of the vessel. This cylinder divides the horizontal cross-section of the vessel into a central reaction zone and an annular hopper zone. It will be understood, however, that the functions of these two zones may be reversed, or if desired the partition, instead of having a more or less cylindrical form, may cut across the horizontal section of the vessel as a chord and be sealed to the wall of the vessel.

The reaction zone is within the reactor proper which is the cylinder 2. It is essential that this cylinder extend upward to a point which is higher than the maximum bed level of fluidized catalyst bed to be retained in the reaction zone during operation. It is also essential that the partition be capable of retaining pseudo liquid catalyst up to the maximum designed working level. Thus, if the partition is not high enough to fulfill these requirements, or is perforated near the top, the bed level cannot be raised. The fluidized catalyst in these cases must then reach a level at which it either overflows the top of the partition or flows through the perforations.

The reactor 2 may be cylindrical up to its top. However, it is desirable that the top of the reactor be somewhat restricted in cross-section, for instance, by capping the cylindrical section with the section of a truncated cone. In the apparatus illustrated the hydraulic radius of the cylindrical reactor 2 is decreased at the top due to the presence within the top of the cylinder of part of the cyclone bodies.

Since the reactor 2 is a true upflow reactor, it will be apparent to those skilled in the art that for any given rate of feed of catalyst and reactant vapor within the range of the designed limits the level of fluidized catalyst would come to an equilibrium below the top of the cylinder 2. Increase in the catalyst rate would tend to raise this level and vice versa. Decrease in the vapor rate would do likewise. If operated in the conventional way the concentration of the suspension leaving the top of the reactor (cylinder 2) would under these equilibrium conditions, be the same as that of the suspension entering the reaction zone at the bottom by line 3. Thus, although there is in the reaction zone a fluidized bed of catalyst, the flows of vapor and catalyst are both concurrent upward, and the exit composition would be the same as the incoming composition with respect to the concentration of suspended catalyst. Thus, the system, as so far described, offers no means of controlling the catalyst mass, and hence the space velocity, independent of the catalyst and vapor rates.

In the apparatus and process of the present invention the catalyst carried in suspension with the effluent vapors from the reaction zone is separated either by settling or by centrifugal means, or both, from the vapors and passed to the contiguous but separate hopper zone which in the case illustrated is the annular zone surrounding the reaction zone. The fluidized catalyst in the hopper zone is held at the desired bed level by controlling the rate of withdrawal of catalyst. Thus, in the case illustrated the hopper zone also functions as a stripping zone and the stripped catalyst is withdrawn by gravity via line 4 at a rate controlled by valve 5.

In the system illustrated the separation of suspended catalyst and passage of the separated catalyst to the fluidized bed in the hopper zone is effected in part by means of a so-called disengaging or settling space 6 where the linear velocity of the vapors is so reduced that some of the catalyst tends to settle out. Due to the short distance between the top of the reactor 2 and the top of the vessel 1 and to the high loading of catalyst carried in the effluent from the reactor, only a part of the catalyst has time or space to settle out in the disengaging zone. A large part of the catalyst is separated from the vapors by the primary cyclone separators 7 and secondary cyclone separators 8. The separators 7 normally operate with loadings of one or more pounds of catalyst per cubic foot which loadings are much above those used in conventional catalytic cracking.

The catalyst separated by the cyclone separators is passed to the outer or hopper zone by the cyclone dip legs 9 and 10. Except for some catalyst which falls into the outer hopper by gravity this constitutes the sole and primary means for transferring catalyst from one zone to the other, e. g., from the reaction zone to the stripping zone.

Steam or other stripping gas is passed into the outer zone by the distributor 11.

The level of catalyst in the hopper zone is retained somewhat below that in the reaction zone by control of valve 5. This valve is controlled in response to the differential pressure between a point 12 low in catalyst bed and a point 13 above the catalyst bed. This method of control is conventional.

Near the bottom the cylinder 2 is perforated or provided with suitable ports which allow limited communication between the outer and inner zones. On either side of these openings vertical baffle or partition members 14 are placed in such manner as to make the communication through the said cylinder tube into a U path. These baffles which, in the case illustrated are semi-circular in plan, are sealed to the cylinder 2 at their bottoms and sides. Thus, the spaces between the baffles and the cylinder wall are in effect the two arms of the U. These arms, and especially the inner one, are of substantial length so that a substantial difference in head may be maintained between the two arms by maintaining different catalyst densities therein. The arms should not, however, extend up beyond the catalyst bed level. The different densities are obtained by the injection of different amounts of aeration gas, e. g., steam, into the two sides of the U via lines 15 and 16.

In operation the level of catalyst in reactor (cylinder) 2 is controlled independently of the rate of introduction of catalyst and reactant into the reactor by line 3 by control of the amount or amounts of aeration gas introduced on one of both sides of the U. The amount of aeration gas introduced is preferably controlled automatically to maintain the desired bed level, and hence the space velocity, in the reactor. This is conveniently done by controlling valves 17 in response to differential pressure changes between a point 18 within the fluid bed and a point 19 above the fluid bed.

In the case where a hydrocarbon oil is cracked in the reaction zone and the used catalyst is stripped in the hopper zone the system operates as follows: hot regenerated catalyst and vapors of oil to be cracked are introduced at a substantially fixed desired rates and ratio by line 3. The weight of catalyst to oil in the suspension thus introduced is adjusted in the known manner to obtain the desired reaction temperature and heat balance in the catalytic cracking unit. It depends primarily upon the coke forming tendency of the oil and the depth of conversion and may vary from about 2 to about 30. This suspension after passing through the distributor grate 20 passes up through the reactor 2 in concurrent flow. The reaction temperature is normally between about 850 and 1200° F., and the pressure is normally between 1 and 10 atmospheres absolute. The space velocity, which determines the conversion, is governed by the amount of catalyst in the reaction zone or, in other words, by the level of the fluidized catalyst bed therein. This level is adjusted to give the optimum conversion which will vary in different cases depending upon the particular oil being cracked and the character of the catalyst but is usually between about 35 and 80%, e. g., 55%. In order to obtain the desired space velocity, catalyst is passed from the stripping zone to the reaction zone through the U shaped or cup shaped communication described. Thus, fluidized catalyst from the stripping zone passes as a dense fluid down the outer arm of the U; passes through the orifices in the reactor 2, and then up through the inner arm of the U into the reactor zone. This flow is caused by differences in density in the two arms of the U. The density of the catalyst in the inner arm is adjusted by the rate of introduction of steam or other aeration gas by line 15. If this flow is increased, the level of the catalyst bed in the reactor is raised thereby decreasing the space velocity and increasing the conversion. At the same time, the concentration of suspended catalyst in the overhead from the reactor is increased above that in the stream entering by line 3 and the loading of the cyclones 7 is increased.

If it is desired to increase the space velocity above that which would normally be obtained at the desired through-put of oil and catalyst via line 3 the differential pressure recorder-controller 21 is adjusted to introduce more steam by line 16 and less by line 15. The flow of catalyst through the U connection is thereby reduced, stopped, or reversed, depending upon the amounts of steam applied; this results in lowering the level of the bed of catalyst in the reactor.

In principle my invention depends upon the fact that in a true upflow type reactor the concentration of catalyst carried out at the top of the reactor in suspension in the vapors above the fluidized bed depends upon the rate of catalyst introduction into the reactor and the level of the bed of catalyst within the reactor. This level automatically adjusts itself to make the catalyst intake and out-take rates equal. Since the amounts of catalyst and oil introduced into the cracking system by line 3 are normally fixed by other considerations for each given case, the bed height, and hence the space velocity, ordinarily will self-adjust to values which generally are not optimum. Flexibility in this regard is obtained by separate or controlled transfer of catalyst into or from the reaction zone from or to a separate hopper or surge zone which may conveniently also function as a catalyst stripping zone. The apparatus illustrated shows one suitable and preferred arrangement for carrying out the catalytic cracking of hydrocarbon oils with conventional finely divided cracking catalyst in a true upflow or top draw-off reactor using the principle of the invention. This apparatus may be modified as mentioned above. Thus, the effluent from the reactor may be passed directly to a cyclone separator instead of passing first into a disengaging space, and the hopper zone may if desired be separately housed. These and similar modifications which will be apparent to those skilled in the art may be made while still employing the principles of the invention. It should be noted however, that no modification is permissible which destroys the true upflow (top draw-off) character of the reactor.

I claim as my invention:

1. In the operation of an upflow fluid catalyst reactor the improvement which comprises maintaining a bed of fluidized catalyst in a reaction zone, continuously introducing reactant vapors and catalyst into the bottom of said bed in said reaction zone at fixed desired rates, continuously withdrawing reactant vapors containing suspended catalyst from the top of said reaction zone the quantity of catalyst carried in suspension being at least equal to the quantity of catalyst in suspension in said vapors introduced, separating at least the major amount of catalyst from the withdrawn suspension and collecting the separated catalyst as a dense bed separate from but contiguous to said first-mentioned fluidized catalyst bed, and maintaining the level of fluidized catalyst in said first-mentioned fluidized catalyst bed at a desired level above the equilibrium level corresponding to said fixed desired rates by transferring catalyst from said second-mentioned dense fluidized bed to said contiguous first-mentioned fluidized bed with steam, the rate of said catalyst transfer and hence the bed level being controlled by control of the steam rate.

2. In the operation of an upflow fluid catalyst reactor the improvement which comprises maintaining a bed of fluidized catalyst in a reaction zone, continuously introducing reactant vapors and catalyst into the bottom of said bed in said reaction zone at fixed desired rates, continuously withdrawing reactant vapors containing suspended catalyst from the top of said reaction zone the quantity of catalyst carried in suspension being substantially in excess of the quantity of catalyst in suspension in said vapors introduced, separating at least the major amount of catalyst from the withdrawn suspension and collecting the separated catalyst as a dense bed separate from but contiguous with said first-mentioned fluidized catalyst bed, and maintaining the level of fluidized catalyst in said first-mentioned fluidized catalyst bed at a desired level above the equilibrium level corresponding to said fixed desired rates by transferring catalyst from said second-mentioned dense fluidized bed to said first-mentioned fluidized bed with steam, the rate of said catalyst transfer and hence the bed level being controlled by control of the steam rate.

References Cited in the file of this patent

UNITED STATES PATENTS

| | | |
|---|---|---|
| 2,304,128 | Thomas | Dec. 8, 1942 |
| 2,464,812 | Johnson | Mar. 22, 1949 |
| 2,539,263 | Munday | Jan. 23, 1951 |
| 2,612,433 | Nicolai | Sept. 30, 1952 |
| 2,698,281 | Leffer | Dec. 28, 1954 |
| 2,700,641 | Rehbein | Jan. 25, 1955 |